United States Patent [19]

Blanding et al.

[11] Patent Number: 4,795,070
[45] Date of Patent: Jan. 3, 1989

[54] WEB TRACKING APPARATUS

[75] Inventors: Douglass L. Blanding, Rochester; Terry N. Morganti, Brockport, both of N.Y.

[73] Assignee: Eastman Kodak Company, Rochester, N.Y.

[21] Appl. No.: 900,654

[22] Filed: Aug. 26, 1986

[51] Int. Cl.$^4$ ............................................. B65H 23/02
[52] U.S. Cl. ....................................................... 226/15
[58] Field of Search ................. 226/15, 190, 192, 193, 226/196, 21

[56] References Cited

U.S. PATENT DOCUMENTS 3,107,036 10/1963 Richards et al. ............... 226/190 X
3,265,272 8/1966 Smith ................................... 226/196
3,986,650 10/1976 Swanke et al. .................. 226/196 X
4,303,189 12/1981 Wiley et al. ........................... 226/15
4,647,239 3/1987 Maezawa et al. ............... 226/199 X Primary Examiner—John M. Jillions
Attorney, Agent, or Firm—James A. Smith

[57] ABSTRACT

A mechanism for maintaining a moving web of sheet material in its proper path along an edge guide in an apparatus such as a photographic printer. A compliant roller is mounted on a roller shaft which is pivoted at each end to a linkage which is itself pivoted relative to a stationary frame. This articulated linkage permits the roller to find its natural stable position, rolling on the moving web such that its axis, the roller shaft, is substantially perpendicular to the travel path of the web. A tension spring between frame and linkage biases the roller and the web toward its desired position along the edge guide.

8 Claims, 3 Drawing Sheets

WEB TRACKING APPARATUS

BACKGROUND OF THE INVENTION

1. Field of the Invention

The present invention relates to a mechanism for maintaining a moving web of sheet material, such as paper, in a predetermined position relative to a stationary guide. The invention has specific application as part of a photographic printing apparatus in which images from photographic film are sequentially projected and printed on photographic paper moving in a continuous web through the apparatus. It is not limited to that environment, however.

2. Description of the Prior Art

In any apparatus in which paper or other sheet material is fed in a continuous stream, such as from a feed roll, the moving web has a tendency to wander side to side from its desired path of travel. In a photographic printer, it is essential that the web of photographic print paper be held precisely to its proper path through the various process stations to insure that all process steps are correctly performed and that the final print is properly centered.

A typical prior art web tracking apparatus is shown and described in Research Disclosure of March 1980, item #19160 disclosed by J. E. Morse. The Morse publication describes a roller which is pressed against and rolled on the surface of a web which is being pulled over a stationary support or platen. The roller axis is canted or skewed by some small angle relative to the perpendicular to the web path. As the paper moves, in addition to rolling action, there is continual lateral gripping or scuffing action between the soft compliant roller and the moving web due to the angular skew. This continual lateral gripping action forces the web laterally against an edge guide plate mounted along side the web path. With respect to such apparatus the skew angle is critical. If the skew angle is too large the gripping action both continual and macroscopic in magnitude can be harmful to delicate surfaces such as a photosensitive paper. If the skew angle is too small the desired tracking action is not obtained.

The skew angle must be periodically readjusted in such prior art web tracking apparatus due to the variability of various influences, such as wear and aging of the compliant roller, changes in coefficient of friction and variations in the contact force of the roller.

SUMMARY OF THE INVENTION

It is an object of the present invention to provide a roller apparatus for maintaining the lateral position of a moving web which operates by substantially pure rolling contact, with a minimum of gripping contact, with the moving web and which is less effected by the variability of the aforementioned influences.

The invention may be summarily described as a roller for rolling on a moving web and held in contact with the web by its own weight or by additional downward force. The roller is connected to a stationary pivotal mount so that as the web moves, the roller inherently finds its own rolling position at which the roller axis is substantially perpendicular to the instantaneous web path at the line of contact between them. When the web is moving in its desired path, and is against an edge guide plate alongside the web path, the roller will rotate on its axis substantially perpendicular to the web path. If the web is displaced laterally from the edge guide, a spring force will pull the roller and the web back toward the guide. Because the roller rotates on an axis substantially perpendicular to the web path and is not dependent on the criticality of a skew angle, the variability of the aforementioned influences has substantially less effect on the operation of the tracking apparatus.

DESCRIPTION OF THE ILLUSTRATED PREFERRED EMBODIMENT

Figure 1:
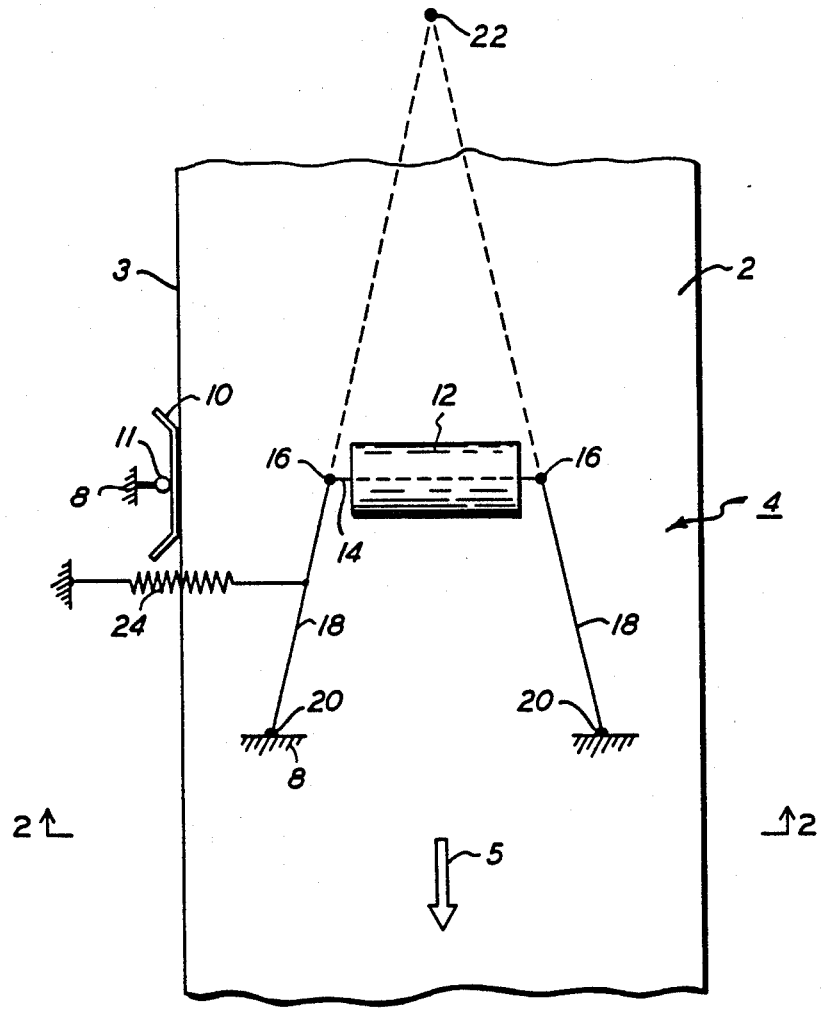
FIG. 1 is a schematic top plan view of the web tracking apparatus of this invention.
Figure 2:
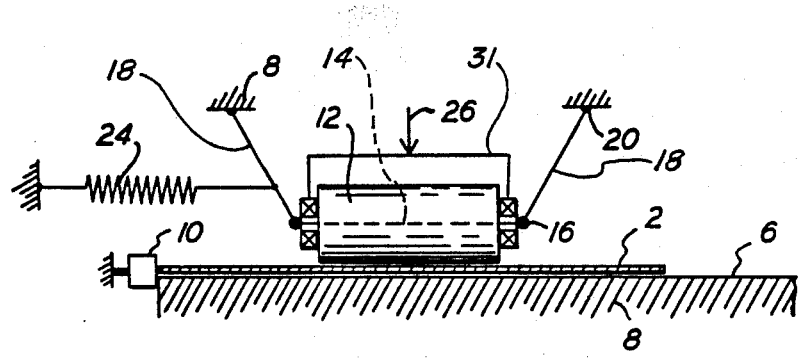
FIG. 2 is a schematic front elevation view of the apparatus shown in FIG. 1.

Referring now to FIGS. 1 and 2, a continuous web of paper 2 is seen from above (FIG. 1) and as if from its leading edge (FIG. 2). Web 2 is moving in the direction of the arrow 5 relative to a web tracking mechanism generally indicated at 4 by which the web is continually guided to maintain its desired path of travel. The web is moving on a stationary support or platen 6 (the space between web and platen shown on FIG. 2 is only for the purpose of distinguishing them). In the proper or desired path of travel of the web 2, its edge 3 moves along and in sliding contact with an edge guide 10. The platen is stationarily mounted on a machine frame which is schematically represented at 8. The edge guide 10 is pivotally supported at 11 on the frame 8 for pivotal movement about an axis perpendicular to the web 2.

Figure 4:
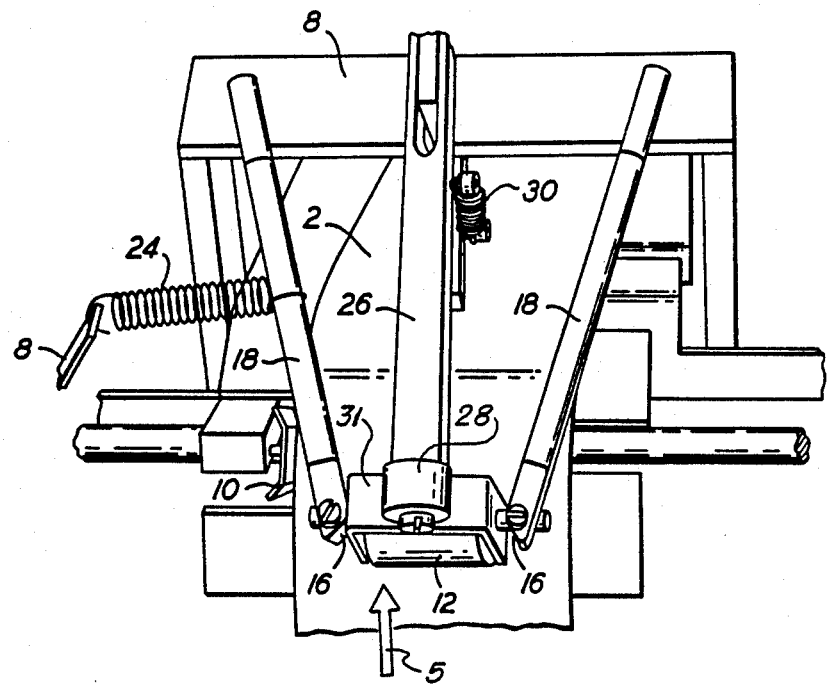
FIG. 4 is a perspective, as from an elevated front position, of the apparatus represented in FIGS. 1 and 2.
Figure 5:
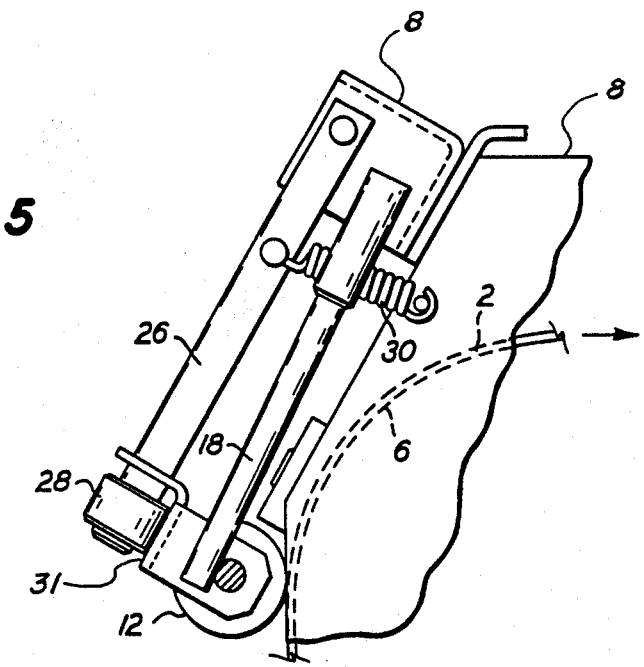
FIG. 5 is an end view as from the right side of FIG. 4.

The mechanism 4 includes a roller 12, of a rubber or other compliant frictional material, which is rotatable on a roller shaft 14. Roller shaft 14 is connected at each end, at roller pivot joints 16, to a pivot arm 18, each of these pivot arms in turn being connected to frame pivot joints 20 which are suitably mounted on the frame 8 at points above and out of the way of the web path 5. Thus, the linkage including pivot arms 18, roller shaft 14, and roller 12 is quite freely movable about the two frame pivot joints 20 and the two roller pivot joints 16. Imaginary lines extending from the pivot arms 18 meet at a point 22 which is the virtual caster axis of the mechanism. A low tension spring 24 is connected to one of the pivot arms 18 and to the frame 8, providing a small force on the order of ounces urging the mechanism toward the edge guide 10. A lever arm 26 (FIGS. 4 and 5) is pivotally mounted to the frame 8 and includes a pressure roll 28 and a tension spring 30 connected to the lever arm 26 and to the frame 8. This provides downward force, represented by the schematic lever 26 in FIG. 2, against the mechanism 4, and thereby maintains the contact between the roller 12 and the web so that the lateral force of spring 24 will be transferred to the web. The roller 28 is in rolling contact with the steering roller mount 31 (FIG. 5) and because of this it does not constrain lateral movement of the steering roller. The sole function of lever arm 26 and pressure roll 28 is to press downward on the steering roller mount.

The roller 12 will inherently seek a position on the moving web such that the axis of the roller is substantially perpendicular to the travel path of the web. This is analogous to the situation of a trailer towed by an automobile, the trailer inherently seeking the position at which the axis of its wheels is perpendicular to the travel direction of the automobile. In this analogy, the imaginary point 22 in FIG. 1 is the trailer hitch ball joint.

As long as the web 2 is against the edge guide 10, the roller 12 will rotate in its neutral position on its axis perpendicular to the web travel path. If the web is somehow displaced laterally from the edge guide, the spring will urge the roller and web back toward the guide. In such an "unnatural" condition, the lateral displacement of the roller plus the restoring force of spring 24 steers or guides the paper back towards the edge guide and a stable condition.

To state this another way, while the web 2 is moving along the edge guide 10, the roller 12 rotates in its desired position with its axis perpendicular to the web travel path. The web is gently restrained from leaving the edge guide by the roller, and the roller, in turn, gently restrained by the spring. Any such aberrant lateral displacement of the moving web from the edge guide causes the spring to urge the roller and web back toward the guide. The tension in spring 24 is relatively light so that it does not overcome the friction of the roller on the web and thus does not pull the roller across the web surface.

Figure 3:
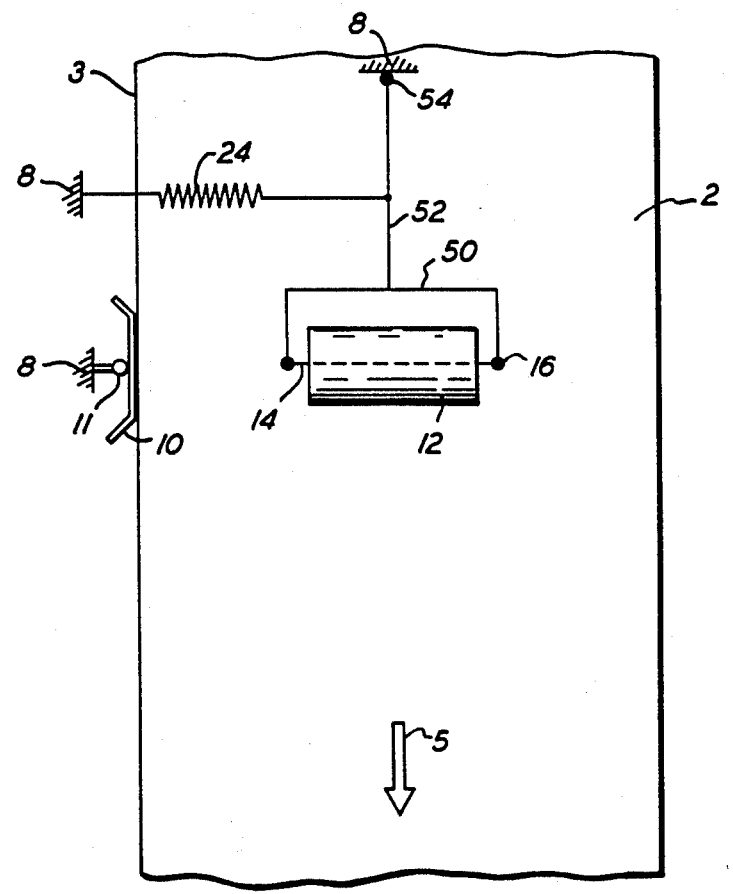
FIG. 3 is a schematic top plan view of an alternate embodiment of the apparatus of this invention.

In FIG. 3, a simplified web tracking mechanism according to this invention is shown, with like numerals designating like elements already discussed in connection with FIGS. 1 and 2. In FIG. 3, a web 2 having a left edge 3 again passes along an edge guide 10 in the travel path 5. In this embodiment, roller 12 is rotatable on a roller shaft 14. Shaft 14 is connected by pivot joints 16 to a yoke 50 which is in turn connected by a single pivot arm 52 to a pivot point or caster axis 54. A tension spring 24 connects to the pivot arm 52 and to the frame 8 to bias the mechanism in the direction of the edge guide 10. In this form, the pivot point 54 becomes the equivalent of the virtual caster axis 22 in FIG. 1, and because of that, the operation of this embodiment is equivalent to that of the embodiment in FIG. 1 although the mechanism extends physically "upstream" of the roller as compared the mechanism of FIG. 1 which is "downstream".

It will be appreciated that during normal operation, the amount of gripping action of the roller on the web is determined by the magnitude of the force of spring 24. During aberrant lateral displacement of the web such gripping action results in lateral motion of the web toward the edge guide.

It is obvious that modifications may occur to others which will remain within the concept and scope of the invention. It is therefore intended that the invention be not limited by the details with which it has been described but only by the purview of the following claims and equivalents thereof.

What is claimed is:

1. Apparatus for maintaining a moving web of material in a predetermined path of travel on a platen and along an edge guide relative to a stationary frame, said apparatus including:
   a compliant roller mounted on a roller shaft for rolling contact on top of said web, said roller shaft being pivotally connected at one end thereof to a first pivot arm and at the other end thereof to a second pivot arm, said pivot arms in turn being pivotally connected to said frame at frame pivot points above said platen, said pivot arms substantially overlying said platen and so disposed that their center lines meet at a point spaced from said roller in the direction from which said web passes under said roller, said roller shaft being perpendicular to said predetermined path of travel when said web is in said predetermined path of travel, and
   a tension spring operatively connected to said frame and to one of said pivot arms, said spring imparting a restraining force on said pivot arms toward said edge guide to impede lateral movement of said roller in the direction away from said edge guide, said restraining force being smaller than the opposed lateral frictional force between said roller and said web to avoid lateral sliding contact of said roller on said web.

2. Apparatus as defined in claim 1 further including means to impart downward force on said roller against said web.

3. Apparatus for maintaining a moving web of material in a predetermined path of travel on a platen and along an edge guide relative to a stationary frame, said apparatus including:
   a compliant roller mounted on a roller shaft for rolling contact on top of said web, said roller shaft being operatively connected to a pivot arm which is in turn pivotally connected to said frame at a pivot point above said platen and spaced from said roller in the direction from which said web passes under said roller, said roller shaft being perpendicular to said predetermined path of travel when said web is in said predetermined path of travel, and
   a tension spring operatively connected to said frame and to said roller said spring imparting a restraining force on said pivot arm toward said edge guide to impede lateral movement of said roller in the direction away from said edge guide, said restraining force being smaller than the opposed lateral frictional force between said roller and said web to avoid lateral sliding contact of said roller on said web.

4. Apparatus as defined in claim 3 further including means to impart downward force on said roller against said web.

5. Apparatus for maintaining a moving web of material in a predetermined path of travel on a platen and along an edge guide relative to a stationary frame, said apparatus including:
   a roller supporting structure pivotally mounted to said frame above the path of travel of said web,
   a compliant roller rotatably mounted on a roller shaft relative to said supporting structure for rolling contact on top of said web, said roller supporting structure substantially overlying said platen and being pivotally connected to said frame at frame pivot points above said platen, said roller shaft being perpendicular to said predetermined path of travel when said web is in said predetermined path of travel,
   a tension spring operatively connected to said frame and to said roller, said spring imparting a restraining force on said roller supporting structure toward said edge guide to impede lateral movement of said roller in the direction away from said edge guide, said restraining force being smaller than the opposed lateral frictional force between said roller and said web to avoid lateral sliding contact of said roller on said web, and means to impart downward force to said roller to maintain engagement of said roller with said web.

6. Apparatus for guiding a moving web of material in a predetermined path of travel on a platen and along an edge guide relative to a stationary frame, said apparatus including:

a compliant roller mounted on a roller shaft for rolling contact on top of said web, said roller shaft being operatively connected to a pivot linkage which substantially overlies said platen and which is in turn pivotally connected to said frame, at a frame pivot point above said platen thereby permitting lateral displacement of said roller in response to corresponding lateral displacement of said web from said predetermined path of travel, said roller being disposed for rotation about its axis perpendicular to said predetermined path of travel when said web is in said predetermined path of travel; and a tension spring operatively connected to said frame and to said roller, said spring imparting a restraining force on said pivot linkage toward said edge guide to impede lateral movement of said roller in the direction away from said edge guide, said restraining force being smaller than the opposed lateral frictional force between said roller and said web to avoid lateral sliding contact of said roller on said web.

7. Apparatus for guiding a moving web of material in a predetermined path of travel on a platen and along an edge guide relative to a stationary frame, said apparatus including:

a compliant roller mounted on a roller shaft for rolling contact on top of said web, said roller shaft being articulated on a linkage relative to said stationary frame, said linkage being in turn articulated on said frame at a point above said platen and spaced from said roller so that said linkage substantially overlies said platen permitting said roller to find its natural rolling position on said web so that the axis of said roller is always perpendicular to the instantaneous path of travel of said web; and means to restrain said linkage from lateral movement from that position at which the axis of said roller is perpendicular to said predetermined path of travel, said restraining means including a tension spring operatively connected to said frame and to said roller, said spring imparting a restraining force on said linkage toward said edge guide to impede lateral movement of said roller in the direction away from said edge guide, said restraining force being smaller than the opposed lateral frictional force between said roller and said web to avoid lateral sliding contact of said roller on said web.

8. Apparatus for guiding a moving web of material in a predetermined path of travel on a platen and along an edge guide relative to a stationary frame, said apparatus including:

a compliant roller mounted on a roller shaft for rolling contact on top of said web, said roller shaft being articulated on a linkage relative to said stationary frame, said linkage being in turn articulated on said frame at a point above said platen and spaced from said roller so that said linkage substantially overlies said platen permitting said roller to find its natural rolling position on said web so that the axis of said roller is always perpendicular to the instantaneous path of travel of said web;

means to restrain said linkage from lateral movement from that position at which the axis of said roller is perpendicular to said predetermined path of travel, and weighting means to impart downward force on said roller against said web, said weighting means including a weighted lever bearing upon said linkage, said lever being in lateral rolling contact with said linkage to minimize lateral constraint on said linkage.

* * * * *